Oct. 27, 1953  H. D. WITZEL  2,656,668
HEADER MOUNT FOR SIDEHILL HARVESTERS
Filed April 10, 1951  6 Sheets-Sheet 1
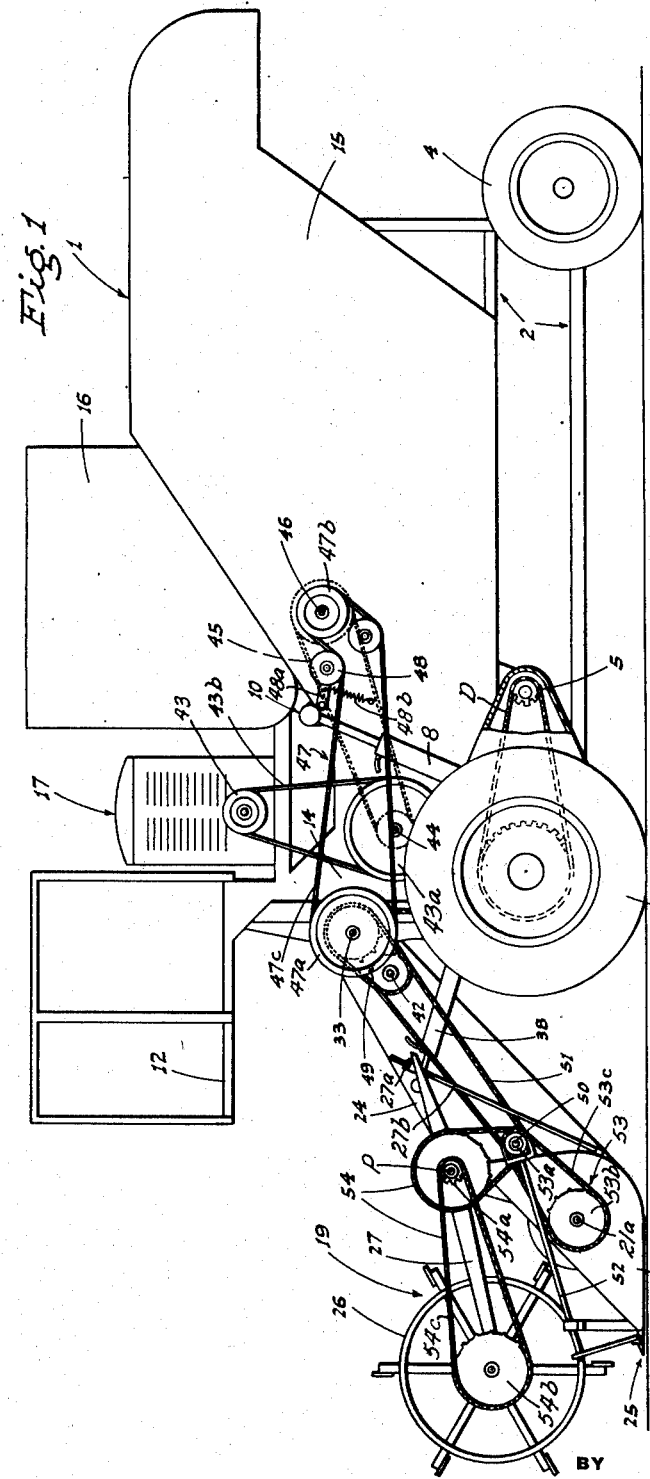
INVENTOR
Homer D. Witzel
BY
ATTORNEYS

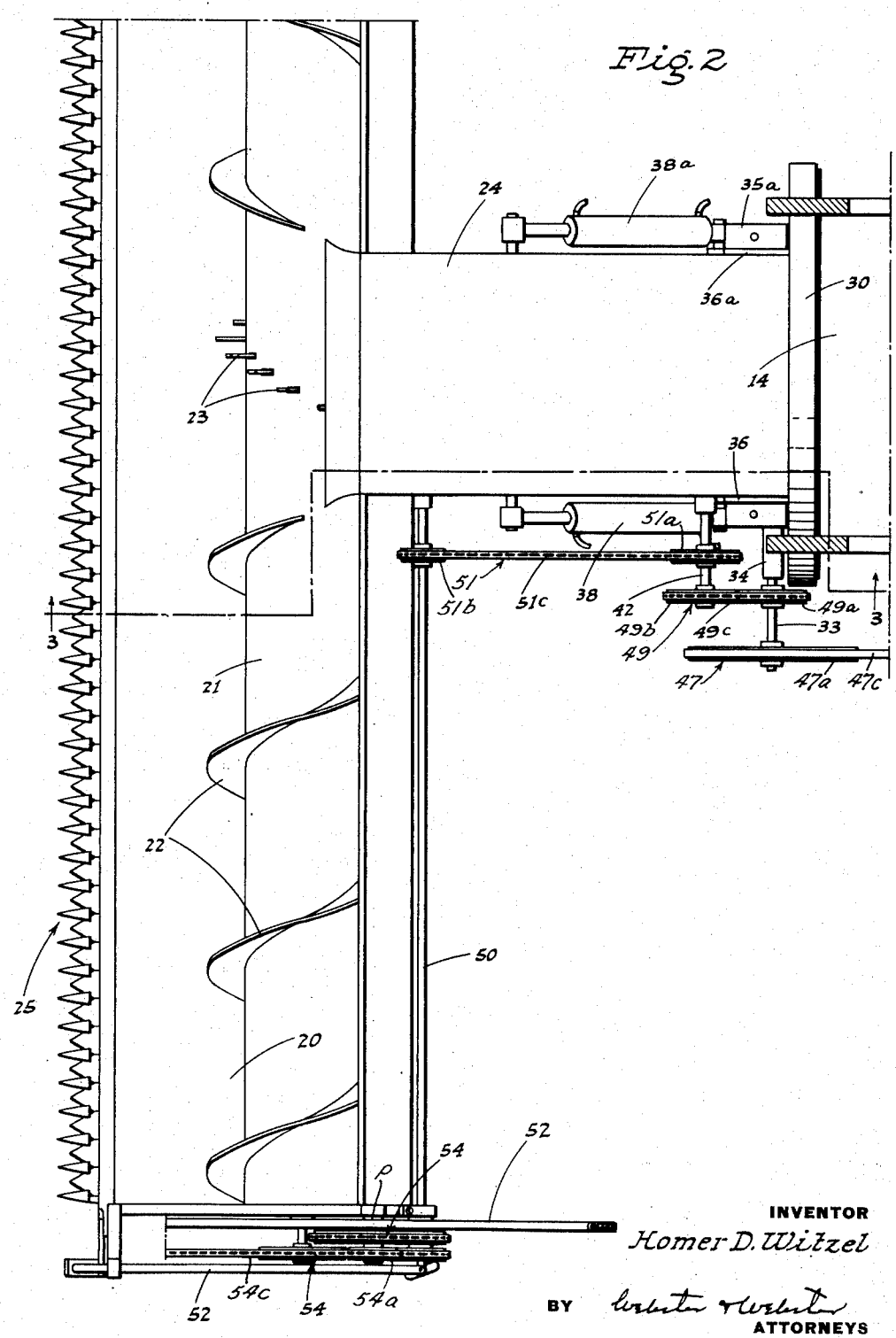

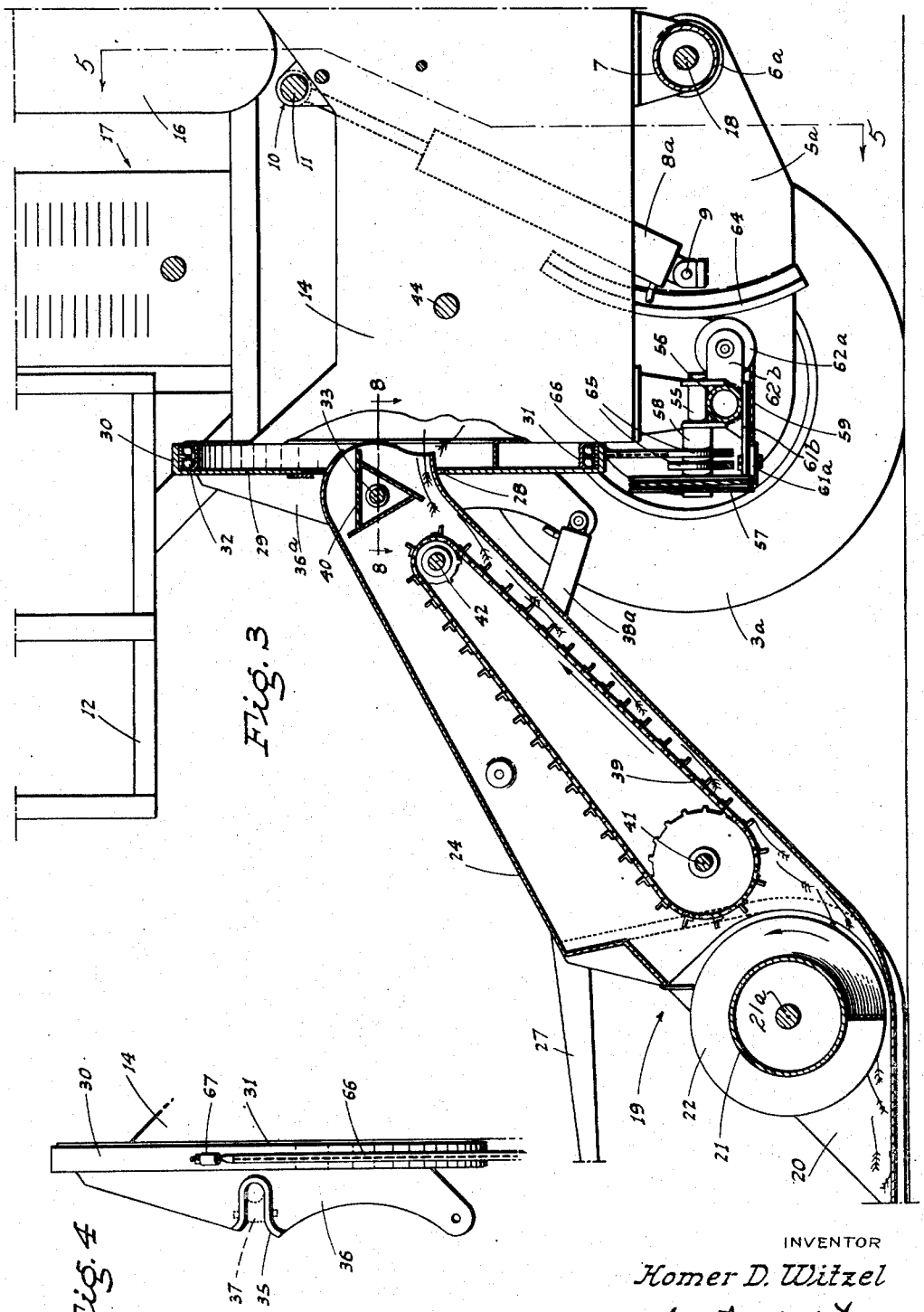

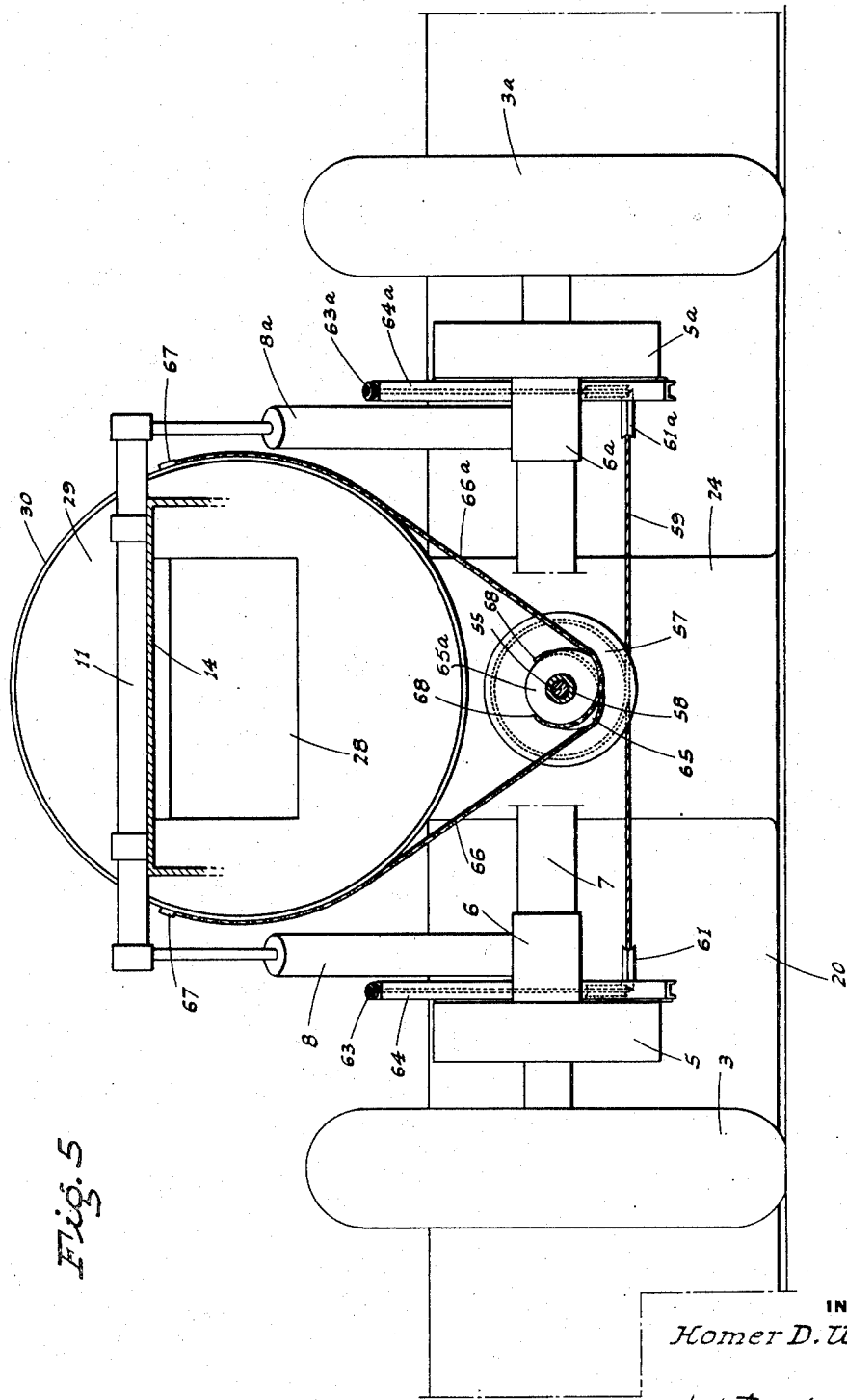

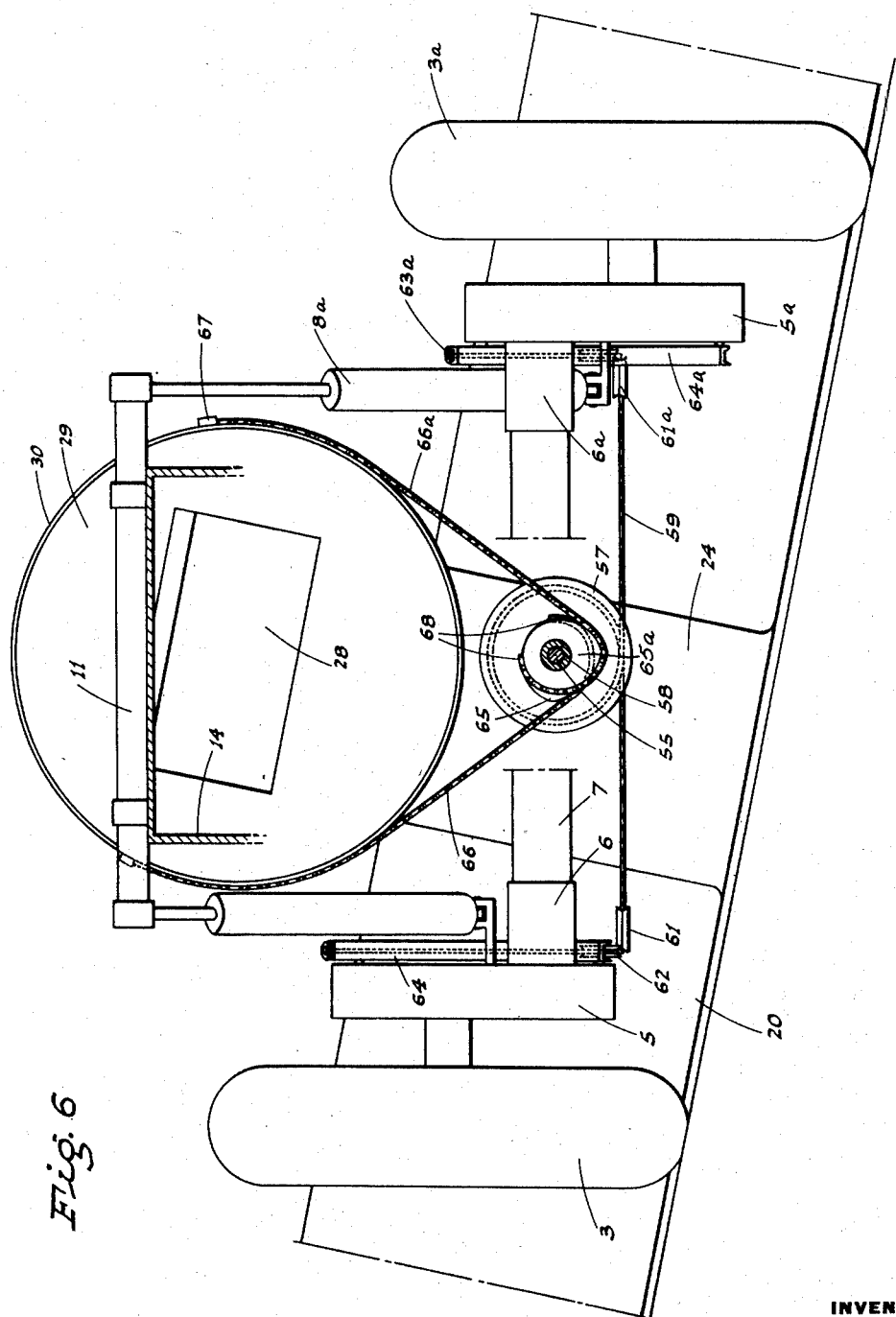

Oct. 27, 1953
H. D. WITZEL
2,656,668
HEADER MOUNT FOR SIDEHILL HARVESTERS
Filed April 10, 1951
6 Sheets—Sheet 6
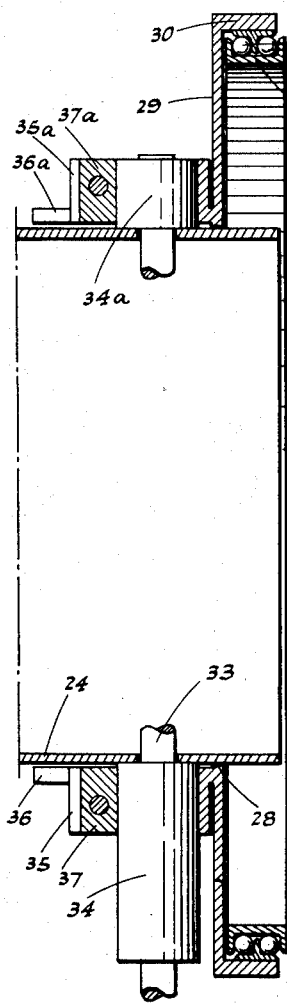
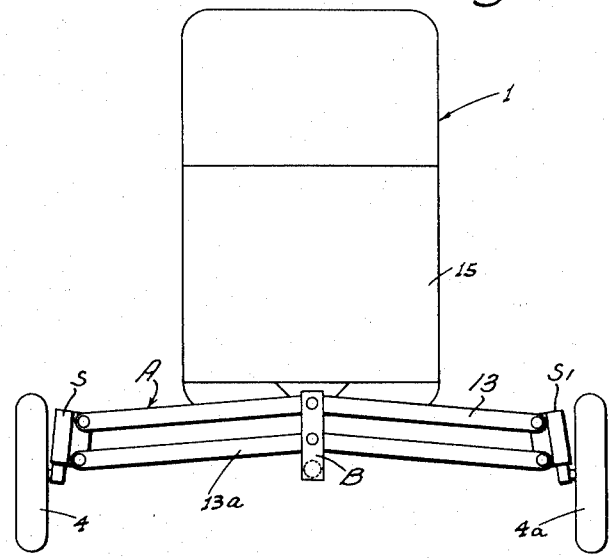
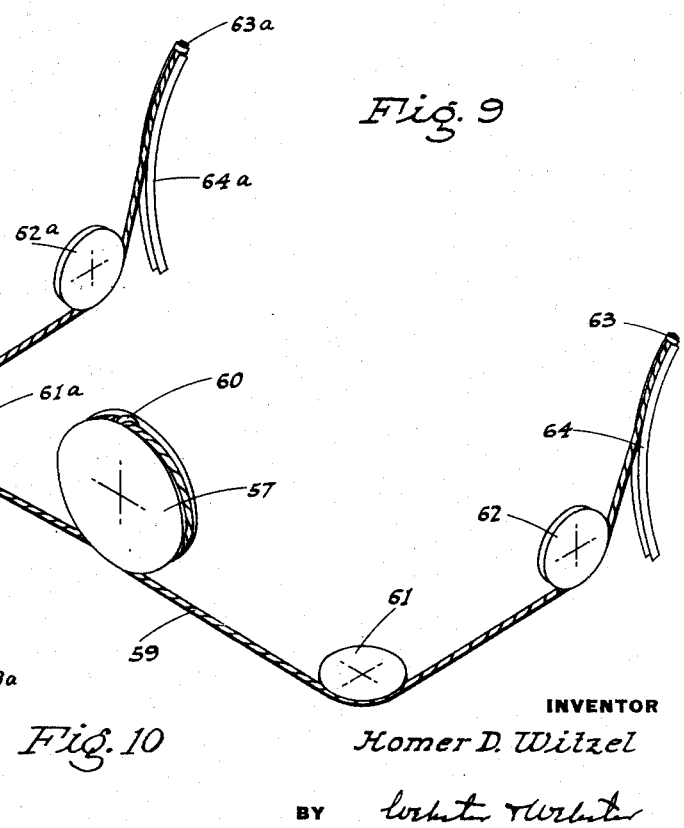
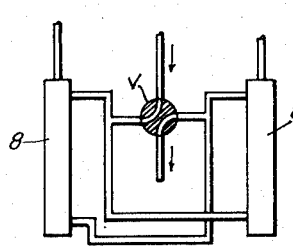
INVENTOR
Homer D. Witzel
BY
ATTORNEYS Patented Oct. 27, 1953

2,656,668

UNITED STATES PATENT OFFICE 2,656,668

HEADER MOUNT FOR SIDEHILL HARVESTERS

Homer D. Witzel, Stockton, Calif., assignor to Harris Manufacturing Company, Stockton, Calif., a corporation of California Application April 10, 1951, Serial No. 220,303

15 Claims. (Cl. 56—209)

This invention relates in general to a grain harvester, and in particular is directed to improvements in a self-propelled, side-hill type harvester.

In such a harvester the front wheels are mounted for opposed relative vertical adjustment to maintain the body of the harvester upright or perpendicular when working along a sidehill; the header being mounted in connection with the body for adjustment to parallel the ground.

It is a major object of the present invention to provide a novel adjustable mount for the header of a harvester of the type described.

Another important object of this invention is to provide a header mount, as in the preceding paragraph, wherein the header is supported for relative rocking adjustment about a longitudinal axis and for independent up or down adjustment; the mount, for the purpose of such adjustments, including a novel, forwardly facing, rotary mounting disc assembly to which the header spout is secured at its upper end for swinging about a transverse axis.

An additional object of the invention is to provide novel control mechanism connected between the front wheels and the header mount; such mechanism being operative in response to opposed vertical adjustment of said wheels to cause an automatic rocking adjustment of the header about its longitudinal axis in a direction and to an extent to maintain the header parallel to the ground.

A further object of the invention is to provide a novel drive system for the working parts of the harvester carried by the header; such drive system being connected to a driven shaft on the body of the harvester, yet is operative in any position of adjustment of the header.

It is also an object of the invention to provide a header mount and control mechanism therefor which are designed to facilitate initial manufacture and assembly; to function effectively and positively with a minimum of maintenance or repair; and to assure of proper delivery of the cut crop from the header to the threshing cylinder of the harvester.

It is a further object to provide a practical and reliable header mount and control mechanism therefor, which structure will be exceedingly effective for the purpose for which it is designed.

These objects are accomplished by means of such structure and relative arrangement of parts as will fully appear by a perusal of the following specification and claims.

In the drawings:

Fig. 1 is a side elevation, partly broken out and in section of a sidehill, self-propelled harvester embodying the present invention.

Fig. 2 is an enlarged fragmentary top plan view of the header and its mount, partly in section.

Fig. 3 is an elevation, mainly in section, on line 3—3 of Fig. 2.

Fig. 4 is a fragmentary side elevation of the mounting disc assembly, with the header spout detached.

Fig. 5 is a transverse view taken rearwardly of the front wheels and looking forwardly at the disc assembly and header and taken substantially on line 5—5 of Fig. 3; the header being in horizontal position and the parts of the control mechanism being in their corresponding positions.

Fig. 6 is a similar view, but shows the header as tilted so as to remain parallel to a sidehill.

Fig. 7 is a reduced-scale rear end elevation of the harvester showing the rear wheel mount.

Fig. 8 is an enlarged fragmentary sectional plan on line 8—8 of Fig. 3; the view being partly broken away.

Fig. 9 is a diagram of the reeving of the control mechanism cable.

Fig. 10 is a diagram of the hydraulic header-spout control system.

Referring now more particularly to the characters of reference on the drawings, the harvester comprises an elongated body, indicated generally at 1, such body being carried on a longitudinal main frame 2 supported at the front by transversely spaced rubber-tire wheels 3 and 3a, and supported at the rear by transversely spaced rubber-tire wheels 4 and 4a.

The front wheels 3 and 3a are rotatably mounted on the forward ends of radial arm housings 5 and 5a vertically swingable about laterally inwardly projecting rear end journals 6 and 6a attached to a cross tube 7 secured in connection with the under side of the body 1. The radial arm housings 5 and 5a are adapted to be vertically adjusted up or down in opposition—whereby to maintain the body 1 perpendicular when the harvester is traversing a sidehill—by means of hydraulic power cylinders 8 and 8a. There are a pair of such cylinders, one on each side of the body 1, and each such cylinder pivotally connects at its lower end, as at 9, to the corresponding radial arm housing 5 or 5a some distance ahead of the axis of swinging motion of the latter. At its upper end each hydraulic power cylinder 8 or 8a is pivotally connected, as at 10, to the corresponding end of a cross shaft 11 fixed on the body 1.

The hydraulic power cylinders 8 and 8a are actuated in opposition so that one extends while the other contracts, by any suitable simple control system such as is shown diagrammatically in Fig. 10, and in which a four-way regulating valve V is interposed, such valve being disposed so as to be accessible to the operator stationed on an overhead platform 12 at the front end of the body 1.

The rear wheels 4 and 4a are journaled in connection with opposite ends of a parallel linkage axle assembly A which comprises upper and lower transversely extending parallel arms 13 and 13a pivoted centrally between their ends on a bracket B depending from the harvester body 1 centrally of its width as shown in Fig. 7. At the outer ends, the arms 13 and 13a are pivoted on the wheel-spindle mounts S and S₁, of the wheels 4 and 4a, respectively. Such parallel linkage axle assembly A is operative to maintain the wheels 4 and 4a perpendicular even though said body 1 be relatively tilted to right or left for the purpose of likewise maintaining the body 1 upright when the harvester is moving along a sidehill.

The body 1 includes, at its forward end portion, a threshing cylinder housing 14, and rearwardly thereof an enlarged, separator housing 15; there being a bulk grain bin 16 upstanding from the separator housing 15. Between the bulk grain bin 16 and the operator's platform 12 an engine unit 17 is mounted, which unit—in addition to driving the harvester parts, as will hereinafter appear—serves, by suitable driving connections (not shown), to actuate a cross shaft 18 in the cross tube 7; the cross shaft 18 being connected by suitable means such as a chain drive D within the housings 5 and 5a (see Fig. 1) in driving relation to the front wheels 3 and 3a; the latter thus being vertically adjustable without interfering with their drive.

Ahead of the front wheels 3 and 3a the harvester includes a header, indicated generally at 19; such header being relatively wide and embodying an elongated, transversely extending auger trough 20 having an auger 21 journaled therein. The auger 21 has helical feed flights 22 thereon which deliver toward the center portion of the auger trough; such flights having their adjacent ends spaced at such center portion, and in the latter the auger 21 includes a helical row of outwardly projecting feed fingers 23.

The auger trough 20 is supported on the outer end of a header spout 24 which extends at an upward and rearward incline; the auger 21 delivering from its center portion directly into the lower end of the header spout 24. The auger trough 20 is fitted, along its forward edge, with a sickle bar unit 25, and a reel 26 cooperates with such auger trough 20 and sickle bar unit 25 from above; such reel 26 being carried on the outer ends of reel supporting arms 27 mounted in connection with the rear upper portion of said auger trough 20. The arms 27 are pivoted intermediate their ends, as at P, for vertical swinging adjustment; each arm at its inner end being engaged by an adjustment nut 27a threaded on an upstanding rod 27b which is mounted at its lower end on the back of the trough 20.

The auger 21, sickle bar unit 25, and reel 26 are driven in the manner as will hereinafter appear.

At its upper end the header spout 24 projects through a central rectangular opening 28 cut in an enlarged, forwardly facing mounting disc 29 at the front end of the body 1. The mounting disc 29 is supported, for rotation about a longitudinal axis, by means of an end flange 30 on the disc cooperating with a mounting ring 31 fixed on the forward end of the body 1; there being ball bearings 32 between the flange 30 and mounting ring 31.

The header spout 24 is attached, at its upper end portion, to the mounting disc 29 for rotary motion with the latter, and for independent up and down adjustment about a transverse axis, as follows:

A cross shaft 33 extends transversely through the upper end portion of the spout 24 and beyond the sides of the same is fitted with bearings 34 and 34a. The bearings 34 and 34a are engaged in initially forwardly opening cradles 35 and 35a formed in transversely spaced, upstanding attachment plates 36 and 36a fixed on the face of the mounting disc 29 on opposite sides of the central rectangular opening 28. Escape of the bearings 34 and 34a from the cradles 35 and 35a is prevented by retention blocks 37 and 37a (see Figure 8).

As so mounted the header spout 24 is capable of up or down adjustment about the cross shaft 33 as an axis, and irrespective of the position of adjustment of the rotary mounting disc 29. Such up and down adjustment of the header spout 24 is accomplished by means of hydraulic power cylinders 38 and 38a pivotally connected between the lower ends of the attachment plates 36 and 36a and forward, elevated points on opposite sides of said spout. The hydraulic power cylinders 38 and 38a are actuated in unison and are under the control of the operator on platform 12.

The numeral 39 indicates an endless conveyor working in the spout 24 to deliver the cut crop from the auger 21 upwardly in said spout along the bottom thereof. The cut crop discharges from the upper end of the spout 24 into the threshing cylinder housing 14; such discharge being aided by a rotary beater 40 mounted on the cross shaft 33 within the spout 24 above the upper end of the conveyor 39. The conveyor 39 is carried on a lower cross shaft 41 and an upper cross shaft 42; the latter being driven as will hereinafter appear.

The working parts associated with the header 19 and spout 24 are driven from the engine and transmission unit 17 in the following manner:

An endless belt and pulley unit comprises an engine driven pulley 43. A lower pulley 43a on a cross shaft 44 and a belt 43b extending between the pulleys drives said cross shaft 44, which extends through the threshing cylinder housing 14, and in fact drives the threshing cylinder. On the opposite side of the body 1 the cross shaft 44 drives a rearwardly extending, endless belt and pulley unit 45 which actuates a cross shaft 46 which extends through the separator housing 15, driving separating mechanism in the latter.

On the near side of the harvester (see Fig. 1) the cross shaft 46 is connected in driving relation to the cross shaft 33 by means of an endless belt and pulley unit 47; this unit comprising a pulley 47a on the shaft 33, another pulley 47b on the shaft 46, and a belt 47c extending between the pulleys. Belt 47c has considerable initial slack, but is normally maintained taut by a belt tightener comprising a roller 48 mounted on a swivel arm 48a pivoted on the harvester body, the arm being connected to a spring 48b which yieldably pulls roller 48 down against the belt. With this arrangement the mounting disc 29 can rotate in one direction or the other, in the manner and for the purpose hereinafter described, without interfering with the drive of the cross shaft 33 from the cross shaft 46; this being accomplished by reason of the fact that as the driven end of the cross shaft 33 rises or falls, the belt tightener 48 has a compensating action on the belt of the endless belt and pulley unit 48. The endless conveyor 29 in the spout is actuated by driving the upper cross shaft 42 from the cross shaft 33 by means of an endless chain and sprocket unit 49.

A lateral shaft 50 extends from the spout 24 to one outer end of the auger trough 20 at the rear upper portion of the latter, and such lateral shaft 50 is driven from the upper cross shaft 42 by an endless chain and sprocket unit 51.

At its outer end the lateral shaft 50 actuates the pitman rod 52 of the sickle bar unit 25, and also drives an endless chain and sprocket unit 53 which turns the auger 21. Likewise, through a speed reducing train of endless chain and sprocket units 54 the lateral shaft 50 drives the reel 26.

Unit 49 comprises a sprocket 49a on the shaft 33, another sprocket 49b on shaft 42, and a chain 49c extending between the sprockets.

Unit 51 comprises a sprocket 51a on shaft 42, a sprocket 51b on the shaft 50, and a chain 51c extending between said sprockets.

Unit 53a comprises a sprocket 53 on the shaft 50, another sprocket 53b on shaft 21a of the auger 21, and a chain 53c extending between the sprockets.

The final unit of the speed reduction drive 54 includes a sprocket 54a coaxial with the pivot P of arms 27, another sprocket 54b connected to the axial shaft of the reel, and a chain 54c extending between these sprockets.

When the harvester is in operation the operator, from the platform 12, regulates the power cylinders 38 and 38a so that the auger trough 20 and sickle bar unit 25 run a proper distance above ground; the sickle bar unit 25 cutting the crop; the reel 26 sweeping the cut crop into the auger trough 20; the auger 21 feeding the cut crop to the header spout 24; and the latter—with the aid of the conveyor 39 and rotary beater 40—delivering such cut crop into the threshing cylinder housing 14, as aforesaid.

When the harvester is operating on a sidehill, the hydraulic power cylinders 8 and 8a are actuated in opposition, whereby to relatively lower one of the front wheels 3 and 3a and to relatively raise the other; this adjustment being made to such extent as is necessary to maintain the body 1 vertical. When this adjustment is made it is requisite that the mounting disc 29 be rotated in a direction and to an extent to maintain the header 19 parallel to the ground; such rotary adjustment of the mounting disc 29 being accomplished automatically in the following manner:

A longitudinal spindle 55 is fixed to, and projects forwardly from, a tubular cross member 56 secured under the forward end of the body 1 whereby such spindle is disposed in a central position directly below the mounting disc 29.

A pulley 57 is turnably mounted by means of a hub 58 on the spindle 55, and a cable 59 is anchored, centrally of its ends—as at 60—to the pulley 57. From the anchor 60 the opposite reaches of the cable turn about the pulley 57 in opposite directions, running off the pulley at the bottom and thence extending laterally to and turning rearwardly about vertical axis sheaves 61 and 61a. From the sheaves 61 and 61a the reaches of the cable 59 run rearwardly, and turn beneath transverse axis sheaves 62 and 62a; the sheaves 61 and 61a and 62 and 62a being mounted in connection with the cross member 56 by suitable means such as brackets 61b and 62b, respectively, projecting from said cross member 56, as shown in Fig. 3.

From the transverse axis sheaves 62 and 62a the separate reaches of the cable 59 extend upwardly, and at their upper ends are anchored—as at 63 and 63a—to the corresponding ends of upstanding, arcuate cable guide shoes 64 and 64a affixed to corresponding ones of the radial arm housings 5 and 5a; such guide shoes 64 and 64a being of forwardly opening channel shape and concentric to the axis of vertical swinging adjustment of said radial arm housings 5 and 5a.

The purpose of the arcuate cable guide shoes 64 and 64a is to maintain, at all times, the same point of pull on the cable reaches relative to the sheaves 62 and 62a. With this arrangement it will be recognized that as one front wheel 3 is adjusted upwardly and the other front wheel 3a adjusted downwardly, the described cable system will rotate the pulley 57 in a related direction; such rotation of the pulley 57 being transmitted to the mounting disc 29, so as to maintain the header 19 parallel to the ground, in the following manner:

The hub 58 of the pulley 57 is elongated and is fitted, rearwardly of said pulley, with a pair of somewhat heart-shaped cams 65 and 65a whose high points are normally in the positions shown in Fig. 5.

Chains 66 and 66a are anchored to opposite sides of the mounting disc 29, as at 67, thence extending downwardly on the flange 30 to adjacent the lower portion of said disc, whence such chains leave the flange and project downwardly, turning beneath corresponding cams 65 and 65a; the chains running up the opposite sides of such cams and being anchored thereto, as at 68.

With the cams 65 and 65a in their normal position, as in Fig. 5, the chains 66 and 66a engage downwardly about the cams from their high points. Upon part-rotation of the cams 65 and 65a simultaneously in one direction or the other under the influence of the pulley 57, the chains 66 and 66a—by reason of the generated shape of said cams—each travel an equal distance, but the cams 65 and 65a become progressively less effective. As a result, the rotation imparted to the mounting disc 29 is slightly less in arcuate extent than the rotation imparted to the pulley 57 by the cable 59 when the front wheels 3 and 3a are vertically adjusted in opposition. This is necessary for the reason that as the front wheels are so adjusted, each swinging about a rearwardly disposed axis, the travel of the cable becomes disproportionately greater relative to the change in vertical position of the wheels, which disproportionately greater travel must be compensated for. This is done by the cam arrangement as above; such cam arrangement preventing over-response, which would otherwise occur, in the automatic rotary adjustment of the mounting disc 29 and the header 19. Such over-response would cause the sickle bar unit 25 of the header 19 to be moved out of parallelism with the ground, if not to actually dig into the ground at one end.

By reason of the described automatic control mechanism in connection between the front wheels 3 and 3a and the rotary mounting disc 29, the header 19 is constantly maintained parallel to the ground without attention by the operator from his station on the platform 12; the only header adjustment which is under the manual control of the operator being the up and down setting of the header 19 by the hydraulic power cylinders 38 and 38a. Operation of the harvester is thus facilitated, and irrespective of the sidehill incline the header maintains its parallelism to the ground, yet with the cut crop feeding constantly and without obstruction from the spout 24 into the threshing cylinder housing 14.

The described header mount and control mechanism therefor provide a very practical and reliable improvement in a harvester of the type described; such header mount and control mechanism functioning smoothly, yet positively, for the accomplishment of automatic leveling of the header at all times. Additionally, when the harvester is in operation, the actual load of the body is carried at the front by the described cable system; the cylinders 8 and 8a serving to level the body, but are not the primary load supporting medium.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, what is claimed as new and useful and upon which Letters Patent are desired is as follows:

1. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for spout discharge into the body, and means between the body and disc to rotate the disc.

2. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for independent up or down adjustment, means between the body and disc to rotate the disc, and separate means between the body and spout to adjust the spout up or down; the spout discharging into the body in all positions of adjustment thereof.

3. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, the disc having an opening with which the adjacent end of the spout registers, means securing the spout in connection with the disc for rotation therewith and for independent up or down swinging adjustment, said swinging adjustment being about a transverse axis adjacent said opening whereby to maintain said register of the spout therewith, means between the body and disc to rotate the disc, and separate means between the body and spout to swingably adjust the spout up or down.

4. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for spout discharge into the body, and control mechanism connected between the wheels and disc operative in response to said vertical adjustment of the wheels to automatically rotate the disc in a direction and to an extent to maintain the header substantially parallel to the ground.

5. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for spout discharge into the body, and control mechanism connected between the wheels and disc operative in response to said vertical adjustment of the wheels to automatically rotate the disc in a direction and to an extent to maintain the header substantially parallel to the ground; said mechanism including a pulley mounted on the body, a cable engaged in rotating relation on the pulley, reaches of the cable extending in guided relation to anchor points vertically adjustable with corresponding wheels, and means between the pulley and disc to transmit rotation from the pulley to the disc.

6. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for independent up or down adjustment, control mechanism connected between the wheels, body and disc operative in response to said vertical adjustment of the wheels to automatically rotate the disc in a direction and to an extent to maintain the header substantially parallel to the ground, and separate means between the body and spout to adjust the spout up or down; the spout discharging into the body in all positions of adjustment thereof.

7. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for spout discharge into the body, a rotary unit journaled on the body on a longitudinal axis adjacent the disc, a cable cooperatively engaged with said unit to rotate the same, the cable having opposed reaches extending laterally outward from the rotary unit, sheaves mounted on the body engaged by said reaches and turning end portions thereof generally in the direction of adjusting motion of the wheels, means anchoring the ends of the reaches for adjustment with the wheels, and means between the rotary unit and the disc to impart rotation from said rotary unit to the disc.

8. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, means securing the spout in connection with the disc for rotation therewith and for spout discharge into the body, a rotary unit journaled on the body on a longitudinal axis adjacent the disc, a cable cooperatively engaged with said unit to rotate the same, the cable having opposed reaches extending laterally outward from the rotary unit, sheaves on the body engaged by said reaches turning end portions thereof generally in the direction of adjusting motion of the wheels, means anchoring the ends of the reaches in connection with and for adjustment with the wheels, and means to impart rotation from said rotary unit to the disc; said last named means being flexible connectors attached at one end to opposite sides of the disc, and attached at the other end in opposed winding relation to said rotary unit.

9. A header mount for a sidehill harvester which includes a body, transverse spaced wheels adjacent the front end of the body, means mounting the wheels on the body for up or down swinging adjustment about a rearwardly disposed axis, power means between the body and mounting means to so adjust said wheels in opposition, and a header in front of the wheels, the header having a spout extending rearwardly toward the front end of the body; said header mount comprising a forwardly facing mounting disc at the front end of the body, means on the body supporting the mounting disc for rotation about a longitudinal axis, means securing the spout in connection with the disc for rotation therewith and for independent up or down adjustment, means between the wheel mounting means and the disc responsive to opposed vertical adjustment of the wheels operative to rotate the disc in a direction and to an extent to maintain the header parallel to the ground, and separate means between the disc and spout to adjust the spout up or down.

10. A header mount for a sidehill harvester which includes a body, transversely spaced wheels adjacent the front end of the body, means mounting the wheels for up or down swinging adjustment about a rearwardly disposed axis, power means to so adjust said wheels in opposition, and a header in front of the wheels, the header having a spout extending rearwardly toward the front end of the body; said header mount comprising a forwardly facing mounting disc at the front end of the body, means on the body supporting the mounting disc for rotation about a longitudinal axis, means securing the spout in connection with the disc for rotation therewith and for independent up or down adjustment, means between the disc and spout to adjust the spout up or down independently of rotation of the mounting disc, a rotary unit journaled on the body on a longitudinal axis below the mounting disc, said unit including a pulley and a pair of cams fixed for rotation together, a cable wound about the pulley with reaches running off the same in opposite lateral directions, sheave means mounted on the body guiding said reaches to provide portions extending upwardly from below and connected to the wheel mounting means whereby opposed vertical adjustment of the wheels causes rotation of the pulley and cams in a related direction, and a pair of flexible elements anchored to opposite sides of the mounting disc and depending therefrom, said flexible elements engaging on and turning beneath corresponding cams and thence being anchored thereto; said cams having a configuration such that upon rotation of the pulley and cams, the flexible elements impart corresponding rotation to the mounting disc but of lesser arcuate extent.

11. A header mount for a sidehill harvester which includes a body having transversely spaced wheels, mounting means for the wheels allowing for relative vertical adjustment thereof in opposition and a header having a spout extending toward one end of the body; said header mount comprising a mounting disc at said end of the body facing the header, means on the body supporting the mounting disc for rotation about a longitudinal axis, the mounting disc having an opening therein and the adjacent end of the spout being in register with such opening, bearings projecting laterally from opposite sides of the spout at said adjacent end, attachment members fixed on the face of the disc on opposite sides of the opening, means securing the bearings on said members, means between the wheel mounting means and the disc to rotatably adjust the disc, and means to adjust the spout up or down with said bearings as an axis.

12. A header mount for a sidehill harvester which includes a body having transversely spaced wheels, mounting means for the wheels allowing for relative vertical adjustment thereof in opposition and a header having a spout extending toward one end of the body; said header mount comprising a mounting disc at said end of the body facing the header, means on the body supporting the mounting disc for rotation about a longitudinal axis, the mounting disc having an opening therein and the adjacent end of the spout being in register with such opening, bearings projecting laterally from opposite sides of the spout at said adjacent end, attachment members fixed on the face of the disc on opposite sides of the opening, means securing the bearings on said members, means between the wheel mounting means and the disc to rotatably adjust the disc, and a hydraulic power cylinder connected between the disc and spout on a diagonal whereby to adjust said spout up or down.

13. A header mount for a sidehill harvester which includes a body having transversely spaced wheels, mounting means for the wheels allowing for relative vertical adjustment thereof in opposition and a header having a spout extending toward one end of the body; said header mount comprising a mounting disc at said end of the body facing the header, means on the body supporting the mounting disc for rotation about a longitudinal axis, the mounting disc having an opening therein and the adjacent end of the spout being in register with such opening, bearings projecting laterally from opposite sides of the spout at said adjacent end, upstanding attachment plates secured to the face of the disc on opposite sides of the opening, said plates facing laterally and having forwardly opening cradles formed therein intermediate their ends, the bearings being supported in the cradles, forwardly and upwardly inclined hydraulic power cylinders connected between the lower ends of the attachment plates and opposite sides of the spout, and means between the wheel mounting means and the disc to rotatably adjust the disc.

14. A header mount for a sidehill harvester which includes a body supported by transversely spaced wheels relatively vertically adjustable in opposition, and a header having a spout extending toward one end of the body; said header mount comprising a mounting disc at said end of the body facing the header, means on the body supporting the mounting disc for rotation about a longitudinal axis, the mounting disc having an opening therein and the adjacent end of the spout being in register with such opening, means pivoting the spout at said end in connection with the mounting disc for up and down adjustment about a transverse axis, said pivot means including a rotatably mounted transverse shaft, the header including working parts adapted to be driven, driving connections between said transverse shaft and said working parts, a driven transverse shaft on the body, said shafts projecting at one end beyond the longitudinal vertical plane of the adjacent side of the body, and an extensible, endless belt and pulley unit connecting between said ends of the shafts.

15. A structure, as in claim 14, in which the belt of said endless belt and pulley unit is longitudinally oversize, and a belt tightener mounted on the body cooperating with said belt to maintain it taut in any position of adjustment of the transverse shaft of the spout pivoting means.

HOMER D. WITZEL.

References Cited in the file of this patent

UNITED STATES PATENTS

| Number | Name | Date |
|---|---|---|
| 1,877,520 | MacGregor | Sept. 13, 1932 |
| 2,412,002 | Nelson et al. | Dec. 3, 1946 |
| 2,488,592 | Hamilton et al. | Nov. 22, 1949 |
| 2,583,016 | Ritter et al. | Jan. 22, 1952 |